(12) United States Patent
Salz et al.

(10) Patent No.: US 10,949,588 B1
(45) Date of Patent: Mar. 16, 2021

(54) HIGH SPEED, LOW HARDWARE FOOTPRINT WAVEFORM

(71) Applicant: Synopsys, Inc., Mountain View, CA (US)

(72) Inventors: Arturo Salz, Menlo Park, CA (US); Ching-Ping Chou, Mountain View, CA (US); Jean-Philippe Colrat, Mountain View, CA (US); Sébastien Roger Delerse, Mountain View, CA (US); Luc François Vidal, Mountain View, CA (US); Arnold Mbotchak, Mountain View, CA (US)

(73) Assignee: SYNOPSYS, INC., Mountain View, CA (US)

( * ) Notice: Subject to any disclaimer, the term of this patent is extended or adjusted under 35 U.S.C. 154(b) by 127 days.

(21) Appl. No.: 15/809,819

(22) Filed: Nov. 10, 2017

Related U.S. Application Data

(60) Provisional application No. 62/420,553, filed on Nov. 10, 2016.

(51) Int. Cl.
| | |
|---|---|
| *G06F 11/22* | (2006.01) |
| *G06F 17/50* | (2006.01) |
| *G06F 30/331* | (2020.01) |
| *G06F 111/20* | (2020.01) |

(52) U.S. Cl.
CPC ........ *G06F 30/331* (2020.01); *G06F 2111/20* (2020.01)

(58) Field of Classification Search
USPC .......................................... 716/104, 106, 136
See application file for complete search history.

(56) References Cited

U.S. PATENT DOCUMENTS

| | | | | |
|---|---|---|---|---|
| 5,923,865 | A * | 7/1999 | Chilton | G06F 17/5027 703/23 |
| 6,581,191 | B1 * | 6/2003 | Schubert | G01R 31/318357 703/14 |
| 6,651,225 | B1 * | 11/2003 | Lin | G06F 17/5022 716/113 |
| 7,072,818 | B1 * | 7/2006 | Beardslee | G01R 31/31705 703/14 |
| 10,528,690 | B2 * | 1/2020 | Chou | G06F 30/3323 |
| 2009/0157375 | A1 * | 6/2009 | Yamamoto | G06F 17/5036 703/14 |
| 2011/0307233 | A1 * | 12/2011 | Tseng | G06F 17/5027 703/14 |
| 2013/0144589 | A1 * | 6/2013 | Levi | G06F 17/5022 703/14 |

* cited by examiner

*Primary Examiner* — Brian Ngo
(74) *Attorney, Agent, or Firm* — Alston & Bird LLP (57) ABSTRACT

A method of capturing signals during hardware verification of a circuit design utilizes at least one field-programmable gate array (FPGA) and includes selecting, at run time and using one or more pre-compiled macros, a group of signals to be captured during verification of the circuit design and storing values of the group of signals in at least first and second random access memories disposed in the at least one FPGA. The first and second random access memories may be addressable spaces of the same random access memory.

20 Claims, 6 Drawing Sheets

HIGH SPEED, LOW HARDWARE FOOTPRINT WAVEFORM

CROSS REFERENCE TO RELATED APPLICATIONS

The present application claims benefit under 35 USC 119(e) of U.S. Application Ser. No. 62/420,553, filed Nov. 10, 2016, entitled "High Speed, Low Hardware Footprint Waveform", the content of which is incorporated herein by reference in its entirety.

FIELD OF THE INVENTION

The present invention relates to integrated circuits, and more particularly to hardware emulation of integrated circuits.

BACKGROUND OF THE INVENTION

Conventional field-programmable gate array (FPGA) based hardware emulation debug of an integrated circuit design is typically done by connecting probes to the pins of the chip or using internal scan-chain mechanisms. Physical probes tend to be restrictive due to the limited number of pins, while serial scan-chain mechanisms tend to be slow.

Static probes may generate waveforms for a limited number of signals by connecting them to the ports of the design where they become available to the on-board trace memory. Dynamic probes may generate waveforms using a read-back mechanism. One conventional technique utilizes local FPGA resources to capture and buffer the signal waveforms at relatively high speeds enabled by the use of a concurrent capture mechanism that employs dedicated hardware for each captured signal. When the buffers storing the signals fill up, their content is transferred to the host using a high-speed system bus.

Such systems however require a significant amount of hardware resources, thus impacting their capacity. Capturing a new set of signals may require, among other things (i) routing of the signals to the highest level of hierarchy, (ii) increasing in the size of the macro, (iii) changing the inter-FPGA partitioning, and (vi) reexecution of the lengthy place-and-route process on the affected FPGAs. Second, conventional systems provide a limited run-time signal selection method. Because users may not know in advance the number and makeup of the signal groups, changing or adding groups after the design has been compiled causes inefficiency and delays the completion. Moreover, although the capture mechanism is often relatively fast, the system has limited memory to store the waveforms. When the memory is filled, the buffered data must be transferred to the host for storage. When transferring a large amount of data, the FPGAs and modules share the limited communication resources available, thus leading to long idle times, lower throughput, and degraded performance.

BRIEF SUMMARY OF THE INVENTION

A pre-compiled waveform-capture macro, in accordance with one embodiment of the present invention, is adapted to be compatible with other waveform capture features, including coexisting with the FWC™ macro, available from Synopsys, Inc. Utilization of either mechanism is transparent to a user. The waveform capture macro, referred to herein as QiWC™, utilizes few hardware resources to enable a user to designate many of the design signals to be captured. However, the specific individual signals to be captured may be designated at run-time. Thus, a design may be built once and then have different sets of signals captured without additional synthesis, partitioning or FPGA place and route operations. QiWC, among many other advantages, thus (i) reduces the size of the capture hardware; (ii) enables waveform dumping for a large number of signals; (iii) eliminates the need for compiler directives to reduce the number of dumped signals; (vi) allows for high speed waveform dump performance; and (v) separates the design (and its netlist) from the waveform capture mechanism.

QiWC, in accordance with embodiments of the present invention, utilizes a new wide-width capture block that minimizes the amount of fully concurrent hardware and limits the design driver clock by the bandwidth attainable by the system when dumping takes place.

BRIEF DESCRIPTION OF THE DRAWINGS

To easily identify the discussion of any particular element or act, the most significant digit or digits in a reference number refer to the figure number in which that element is first introduced.

DETAILED DESCRIPTION OF THE INVENTION

The performance of a waveform-capture mechanism is limited by the amount of data that is buffered as well as the transfer speed. The data transfer speed is determined by the hardware clock, and the buffer size is proportional to the volume of data generated by the signals being dumped. This volume depends primarily on the extent of the signal transitions and the number of signals being dumped. But, it also depends on the signal capture mechanism's ability to compress the data. In accordance with one aspect of the present invention, to reduce the size of the waveform data during hardware emulation of an integrated circuit design, redundant values are eliminated. Embodiments of the present invention store all the waveform data into one or more relatively large memories, thus enabling higher compression relative to schemes that rely solely on netlist instrumentation methods that scatter the data throughout the design.

Assembling the waveform dumping mechanism into a self-contained block not only enables higher compression schemes, it also completely isolates the design from the capture mechanisms. This isolation, in accordance with embodiments of the present invention, advantageously desensitizes the design from changes in the dump directives, thus allowing for more incremental compilation. Moreover, embodiments of the present invention eliminate the need to add any type of debug instrumentation into the design's RTL or synthesized gate-level netlist, thus simplifying and expediting the compile flow.

Having the waveform dumping mechanism in a prebuilt block ensures that the output of logic synthesis is largely self-determined and does not depend on any waveform directives. The waveform dumping mechanism and its associated macros are thus independent of the design. This allows the entire waveform-capture block to be pre-assembled and delivered as precompiled macros. Selection of the signals marked for dumping at runtime is done completely independently of the design which is compiled prior to the runtime.

In one embodiment, the compile time setup is specified in independent top-level Verilog modules. A user may designate waveform capabilities non-intrusively and without modifying the design. Accordingly, the specification of such directives is ignored if specified in the design.

In one embodiment, the standard Verilog $dumpvars task is used to designate the design blocks to be captured by the embodiments of the present invention (alternatively referred to herein as QiWC) but the pragma "QiWC" must be specified. This task can be invoked with and without arguments. The syntax for this exemplary system task is shown below:

dumpvars_task ::=
(*QiWC *) $dumpvars;
(*QiWC*) $dumpvars (levels [, list_of_instances]);
list_of_instances::=instance {, instance}
instance ::=hierarchical identifier QiWC captures the sequential elements (registers) within the designated hierarchical blocks. Combinational signals may be reconstructed via software.

When invoked with no arguments, $dumpvars designates all the design variables to be dumped. When the task call includes arguments, the first argument indicates the levels of the hierarchy below each specified module instance to dump. Subsequent arguments specify module instances. For example:

(*QiWC*) $dumpvars; // dump all design variables
(*QiWC*) $dumpvars(0, top.core.gpu); // dump all levels below instance top.core.gpu
(*QiWC*) $dumpvars(1, top.cpu1, top.cpu2); // dump 1 level of top.cpu1 and top.cpu2

For QiWC, the compile-time setup can be more of an exclusion mechanism rather than a specification. Because QiWC is configurable at run-time and has a low hardware footprint, the entire design may be specified. However, a user may limit the extent of the capture scheme to exclude blocks that are clearly beyond the scope of any debug tasks.

QiWC may be controlled at run-time either through the simz scripted mechanism or through the C++ API. The simz control is the TCL-driven run-time control interface for ZeBu™, a hardware emulation platform available from Synopsys, Inc., and may include several commands that can control waveform dumping. The simz dump family of commands listed in Table I below support waveform dumping control for QiWC, thus allowing a user to designate individual signals or entire instances to be captured.

```
Simz dump family of commands
dump -file <filename> [-clock <posedge | negedge |both>
<clock_signal>] -<filetype>
dump -add <signal> -fid <fid>
dump -add -instance <list> -fid <fid> [-depth <n>]
dump -close <fid>
dump -flush <fid>
dump -start <fid>
dump -stop <fid>
```

Below is a simz script that may be used to control a QiWC waveform dump, including the run-time designation of the signals to be captured:

set fid [dump -file "waves.ztdb"-qiwc]
dump -add {dut_top.cpu.PC}-fid $fid
dump -add {dut_top.cpu.R0}-fid $fid
dump -add {dut_top.cpu.R1}-fid $fid
dump -start $fid
run 100000
dump -stop $fid
dump -close $fid
finish The first line of the above creates a QiWC run-time object and associates it with the variable "fid". The second through fifth lines designate the signals PC, R0, R1 of the instance top.cpu to be captured. The rest of the script starts the dump, continues the simulation, and finally closes the waveform stream. The QiWC macro may also be controlled by a C++ API. A QiWC object allows a user to add individual signals as well as pre-designated groups of signals called value-sets.

Below is an example of a C++ testbench that controls a QiWC waveform dump, and uses the API to specify individual signals to be captured:

FastWaveformCapture qiwcf;
qiwcf.initialize(zebu);
qiwcf.add("dut_top.cpu.PC");
qiwcf.add("dut_top.cpu.R0");
qiwcf.add("dut_top.cpu.R2");
qiwcf.dumpFile("waves.ztdb");
. . . // rest of the testbench
c=qwicf.closeFile( );

The third line initializes a QiWC run-time object associated with the object qiwcf. The fourth through sixth lines of the above code designate the signals PC, R0, R1 of the instance top.cpu to be captured. The rest of the script starts the dump, runs the testbench, and finally closes the waveform stream.

Figure 1:
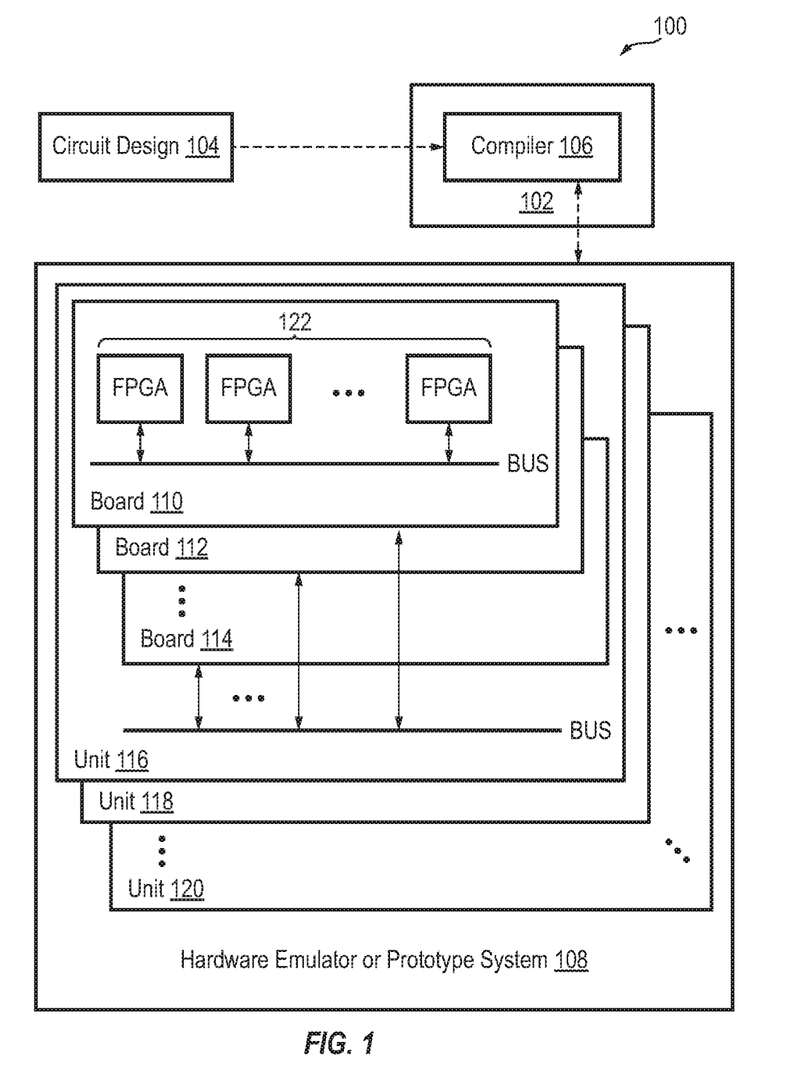
FIG. 1 is an exemplary high-level block diagram of a hardware verification/emulation system, in accordance with one embodiment of the present invention.

FIG. 1 is an exemplary high-level block diagram of a hardware verification or emulation system 100, in accordance with one embodiment of the present invention. The hardware verification system 100 may be used to verify, test or debug a circuit design 104. The hardware verification system 100 may be configured as a prototype system 108 of design 104 using computer system 102, as described further below.

As depicted in FIG. 1, hardware emulation or prototype system 108 is shown as being coupled to computer system 102 that, in turn, includes a compiler 106 module adapted to receive a hardware description language representation of the circuit design 104.

Compiler 106 may include a multitude of software modules that may or may not include a dedicated compiler module. Compiler 106 may transform, change, reconfigure, add new functions to, and/or control the timing of the circuit design 104 to facilitate verification, emulation, or prototyping of the circuit design 104. Further, compiler 106 may compile circuit design 104 and any associated changes into a binary image used to program the hardware emulation system 108.

Thus, the logical functions and timing of the circuit design 104 may first be implemented in the hardware emulation (alternatively emulator) or prototype system 108. Among other advantages, verification of the circuit design 104 in hardware may be accomplished at much higher speed than by software verification alone.

The hardware emulator or prototype system 108 may include a multitude of emulator units (e.g., units 116, 118, 120) each including, in part, one or more circuit boards (e.g., board 110, 112, 114). Each board may include, in part, one or more programmable processors 122, such as Field Programmable Gate Arrays (FPGAs), and other blocks (not shown), such as memories, input/output devices, other processors, and the like. The hardware emulator or prototype system 108 receives a compiled circuit design 104 from compiler 106, and programs the FPGAs 122 to verify the functionality and behavior of circuit design 104. The hardware emulator or prototype system 108 may include a primary or master system clock from which a number of other clock signals may be generated.

Figure 2:
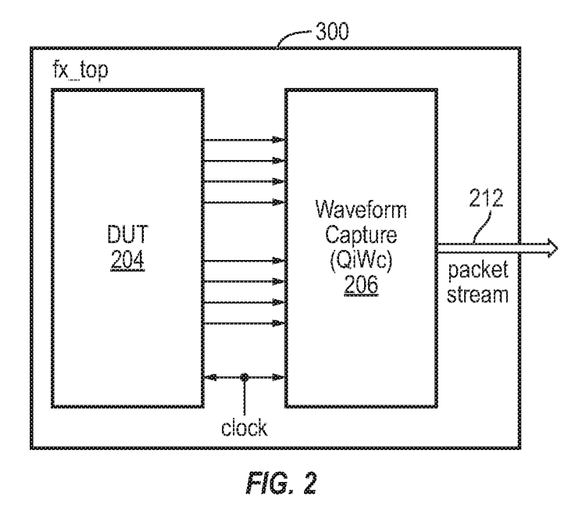
FIG. 2 is a simplified high-level block diagram of a design-under-test coupled to a waveform capture macro, in accordance with one embodiment of the present invention.

FIG. 2 shows, in part, a simplified high-level block diagram 300 of one or more FPGAs into which a synthesized design-under-test (DUT) 204 may be loaded. Waveform-capture block 206 that includes one or more pre-compiled macros is configured to store the signal values generated by the emulated design and transfer the stored signal values via system bus 214 in the form of a data stream. The waveform data captured by block 206 includes signal values. The waveform stream may be generated in the ZTDB™ format, which is the raw data format produced by ZeBu™.

Waveform capture block 206, in accordance with one embodiment of the present invention, may be pre-built and includes modules for generating the data streams that represent the waveforms of the corresponding captured signals. Waveform capture block 206 may be pre-compiled and organized as a collection of QiWC cluster macros. In one embodiment, each such cluster may include a number of basic QiWC macros, each capable of, for example, capturing 32768 (referred to for simplicity as 32k) individual signals. The number of QiWC macros disposed in a cluster may depend on the number of signals captured. The number of clusters may vary, for example, from 0 to 16 in one exemplary embodiment. Therefore, in one exemplary embodiment, signal capture block 206 may capture 524288 (referred to for simplicity as 512k) signals. In one embodiment, each FPGA disposed in the hardware emulator may include up to, for example, 16 QiWC macros.

The following SystemVerilog code generates a pre-compiled cluster for a given number of QiWC blocks (NB_QIWC):

```
module qiwc_ip_cluster #( NB_QIWC = 16 ) (
    input dut_clk,
```

```
    input [4:0] cluster_id,
    input [32*1024*16-1:0]data,
    ...
);
    genvar j;
    for( j = 0; j < NB_QIWC; j++ ) begin : cluster
        qiwc_ip qiwc_( dut_clk, {cluster_id,j[4:0]},
    data[32*1024*j +:32*1024],
        ...);
    end
endmodule
module qiwc_ip (
    input dut_clk,
    input [9:0] qiwc_ip_id,
    input [32*1024-1:0]data,
    ...
);
endmodule
```

The clusters may be obtained by compiling the above exemplary SystemVerilog code 16 times in this example, each time with a different value for the NB_QIWC parameter in the range, e.g., [0 . . . 15]. This results in generating 16 different versions of the QiWC cluster module, corresponding to the module parameterized to incorporate a different number of QiWC IP blocks: qiwc_ip_cluster#(1), qiwc_ip_cluster#(2), qiwc_ip_cluster#(16).

In one example, instead of in-lining all the macros, which would result in progressively larger cluster macros, an organization of 17 different cluster blocks, each of which instantiates the required number of individual QiWC macro blocks may be used, thereby saving disk space.

Waveform capture block 206 may include, for example, a 10-bit code (qiwc_ip_id in the SystemVerilog code shown above) that identifies the macro. This identifier is included in the waveform data stream. The following Table II shows an exemplary 10-bit encoding that may be utilized to classify each specific macro and its corresponding data connections:

TABLE II

| Macro ID | Macro Range (N)* | Connection (Type | Connection Indexes |
|---|---|---|---|
| 000→991 | 0 → 2 | zpv_hs_data (FWC) | (N + 1) * 384-1 → N * 384 |
| 992→1007 | 0 → 16 | zpv_qiwc_data (QiWC) | (N + 1) * 32 * 1024-1 → N * 32 * 1024 |
| 1008→1023 | 0 → 32 | zpv_hs_data (FWC) | (N + 1) * 384-1 → N * 384 |

A QiWC macro, in accordance with embodiments of the present invention, is adapted to capture up to, for example, 32K individual signals in one embodiment. In one embodiment, each FPGA may be configured to include 16 such macros for a total of 512K signals per FPGA. The QiWC macro is designed to use relatively small hardware, while capturing a relatively large number of signals. The small hardware footprint is due to a new capture architecture that more effectively exploits the wide-width resources available in an FPGAs, specifically the large, multi-port block RAMs that may otherwise be underutilized. The QiWC macro architecture re-uses hardware for common operations such as redundancy elimination and data-stream generation.

Figure 3:
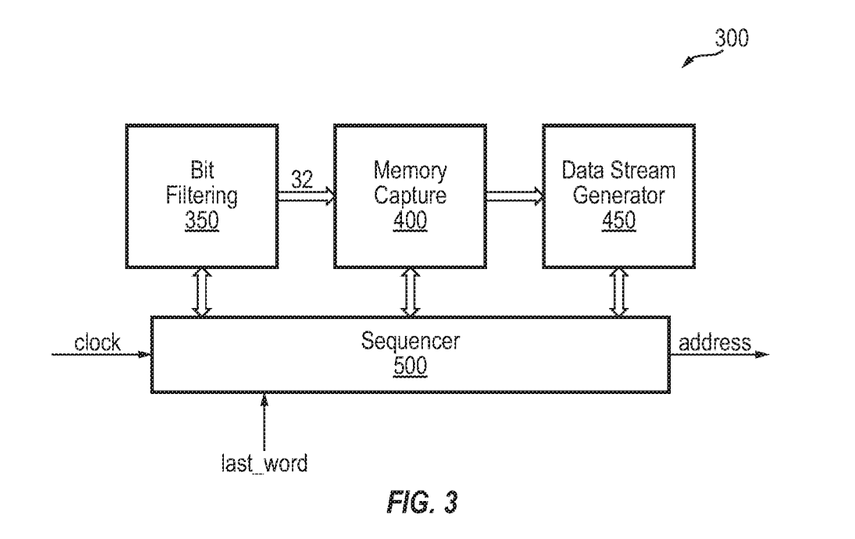
FIG. 3 is a simplified high-level block diagram of a macro adapted to capture signal waveforms, in accordance with one embodiment of the present invention.

FIG. 3 is a simplified high-level block diagram of a basic QiWC macro 300 adapted to capture signal waveforms, in accordance with one embodiment of the present invention. Macro 300 is shown as including, in part, a bit filtering module 350, a memory capture module 400, a data stream generator 450, and a sequencer 500, as described in detail below.

Figure 4:
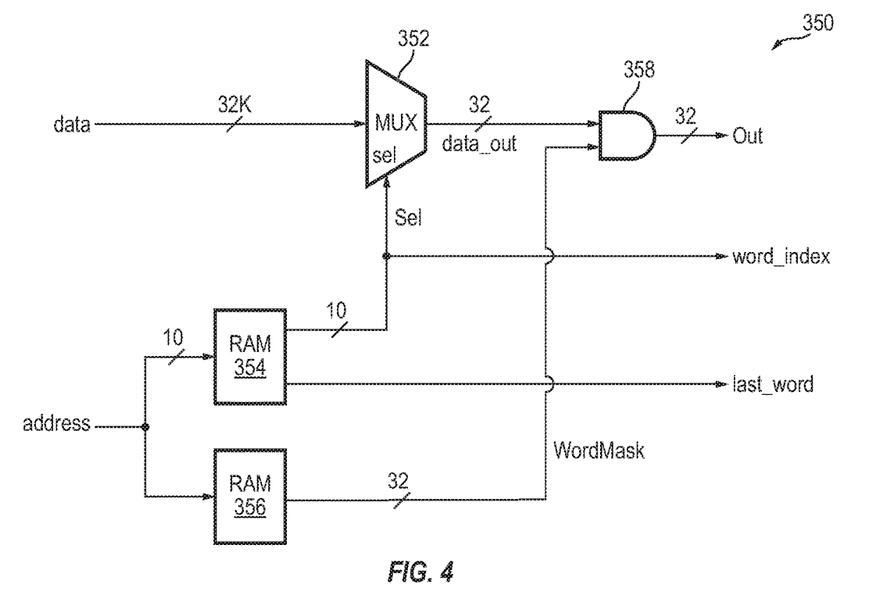
FIG. 4 is a simplified high-level block diagram of bit filtering module disposed in the macro of FIG. 3, in accordance with one embodiment of the present invention.

FIG. 4 is a simplified high-level block diagram of bit filtering module 350, in accordance with one embodiment of the present invention. Bit filtering 350 is shown as including, in part, a multiplexer 352, a random access memory (RAM) 354, a RAM 356 and a combinatorial gate 358. Although not shown, multiplexer 352 may be a multi-stage pipelined multiplexer adapted to output a 32-bit signal data_out from the 32K signals it receives, in response to the select signal Sel it receives from RAM 354. Also supplied by RAM 354 is the index, referred to as Word_index, of the 10-bit word that is retrieved from RAM 354 in response to the address received from sequencer 500. When a set of signals is designated to be captured, the run-time software determines the QiWC macro connected to the signals to be captured, computes the signal's Word_index and bit positions and stores that information in the RAMs 354 and 356. During the capture operation, bits that are not captured (i.e., their WordMask bit is 0) will be masked and transmitted as 0, as described further below.

Referring concurrently to FIGS. 3 and 4, it is seen that the address to RAM 354 is generated by sequencer 500 which increments its count with each transition of signal Clock. Sequencer 500's count provides the address to RAM 354. The data stored in the RAM address supplied by the sequencer is applied to the select terminal of multiplexer 352. Although in FIG. 4, multiplexer 352 is shown as receiving a 32K input signal and delivering a 32-bit signal in response, it is understood that in other embodiments, the data width at the input and output terminals of multiplexer 352 may have any other values. In one exemplary embodiment, multiplexer 352 has a pipeline of 6 stages, As described above, bit filtering module 350 sequentially prunes the values of the 32K inputs to 32 bits that are then forwarded to the memory capture block 4000 for storage and further processing. This enables a user to select at runtime only the signals that need to be examined. Limiting the number of signals whose waveforms are captured reduces the required system bandwidth and the size of the resulting waveform files. The combination of a low hardware requirement with the added flexibility of selecting arbitrary signals for dumping at runtime enables the users to designate large blocks for capture at compile time, and then limit the extent of the captured blocks at runtime. In other words, in accordance with embodiments of the present invention the selection of the signals to be captured at run time is advantageously independent of the compiled design.

Referring to FIG. 4, the run-time software may store in successive locations of the RAM 354 the index of a bit to be captured, thereby causing multiplexer 352 to output the corresponding bit value. For example, storing the values 79 and 1315 at locations 0 and 1, may yield the values of the corresponding data inputs data[79] and data[1315] when the memory is presented with the address values 0 and 1. Using the RAM 354 to map the sequencer count into the corresponding bit indexes of signals to be captured enables the count of the sequencer to be proportional to the number of captured signals. Retrieval of the last data stored in RAM 354 causes signal last_word to be asserted. In other words, signal last_word, is a bit indicating the last entry in the table. As described above, signal Word_index, is the index of the corresponding 32-bit word being captured. RAM 356 stores 32-bit mask values, referred to herein as WordMask, indicating the bits within the word that are marked at run time for capture. Table III below shows an encoding example of the RAM 354 and the RAM 356 to capture 37 bits:

TABLE III

| Address | WordIndex | WordMask | LastWord | Capture Description |
|---|---|---|---|---|
| 0 | 17 | 0x00000026 | 0 | Word 17 - Bits 1, 2, and 5 |
| 1 | 736 | 0x80000001 | 0 | Word 736 - Bits 0 and 31 |
| 2 | 562 | 0xFFFFFFFF | 1 | Word 562 all bits (0. . . 31) |
| . . . 1023 1024 | | | | |

RAM 356 receives the address supplied by sequencer 500. When a set of signals is designated to be captured, the run-time software identifies the QiWC macro that is connected to the signals to be captured, computes the signal's Word_index and bit positions and stores that information in the RAM 354 and the RAM 356. During the capture operation, bits that are not captured (i.e., their WordMask bit is 0) are then masked and transmitted as 0. When the LastWord bit is asserted, the count of sequencer 500 is stopped and reset.

Gate 358 performs an AND function between the 32 bits of data_out and the corresponding 32 bits of the WordMask to filter out bits that have not been marked for capture at run time by the user. In response, gate 3598 generates signal Out that in the exemplary embodiment shown in FIG. 4 is a 32-bit signal.

The memory order (i.e., the relation between memory addresses and word indexes) may depend much more on the order that was specified for the signals to be captured at run-time than on any intrinsic netlist order. Also, the exemplary 32K data inputs to the QiWC macro may be symmetrically equivalent, hence, their connections to the DUT signals may be permuted without any loss in functionality. The QiWC macro may designate the QiWC data pins as symmetrical, thereby allowing the place and route tool to permute the connections to minimize routing bottlenecks. In other words, embodiments of the present invention enable a place a route tool to permute the connections in any order that the place and route tool selects.

Figure 5:
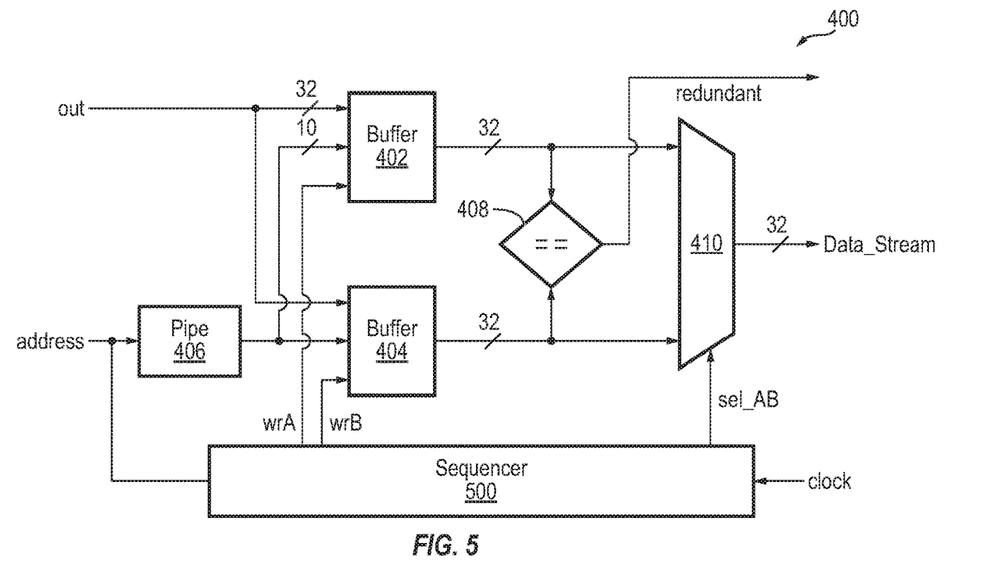
FIG. 5 is a simplified high-level block diagram of memory capture module disposed in the macro of FIG. 3, in accordance with one embodiment of the present invention.

FIG. 5 is a simplified high-level block diagram of memory capture module 400 shown also in FIG. 3. To add clarity, FIG. 5 also shows sequencer 500 of FIG. 3. The address supplied by sequencer 50 is delivered to pipeline block (e.g., shift register) 406 which is adapted to match the delay caused by multi-stage pipelines multiplexer 352 shown in FIG. 4. Following the delay caused by pipeline 406, the address supplied by the sequencer is applied to both memory buffers 402 and 404. Data out received from bit filtering module 350 is delivered to the data input pins of both buffers 402 and 404. Sequencer 500 alternately asserts write enable signals wrA and wrB applied to buffers 402 and 404 respectively. For example, in one embodiment, during even cycles of the sequencer, signal wrA is asserted causing data Out to be stored in buffer 402 at the address supplied by pipeline 406. In such an embodiment, during odd cycles of the sequencer, signal wrB is asserted causing data Out to be stored in buffer 404 at the address supplied by pipeline 406.

In this manner, one of the two buffers 402, 404 stores the last value of signal Out while the other one of the buffers 402, 404 stores the penultimate value of signal Out. Compare block 408 is adapted to compare the content of buffers 402 and 404 during any given read cycle. If the two values stored in buffers 404 and 404 during consecutive odd and even cycles are identical, signal Redundant is asserted. Data retrieved from buffers 402 and 404 are delivered to multiplexer 410. If the data stored in buffers 402 and 404 during two successive clock cycles are found to be redundant, then the data from one of the buffers is transferred via multiplexer 410 as signal Data_Stream, If the data stored in buffers 402 and 404 during two successive clock cycles are not found to be redundant, then the data from both are transferred via multiplexer 410 as signal Data_Stream in response to select signal Sel_AB supplied by the sequencer. Although FIG. 5 is shown as having two buffers, it is understood that a memory capture unit, in accordance with embodiments of the present invention, may have any number of buffers, such as 4.

The bandwidth derating mechanism, as described above, takes into the account the fact that the QiWC's throughput is limited by the propagation time through the bit-filtering module 350 and the load time in memory capture module 400. For a full capture (for example, all 32K signals), it takes 1024 cycles to propagate the inputs to the capture memory. Hence, when running at 50 Mhz, the capture latency limits the driver clock frequency to nearly 50 KHz. However, this upfront slowdown is used to avoid further stalling of the design clocks when transferring the waveform data. The above-described filtering mechanism is designed so that the frequency derating is adaptive to accommodate the necessary latency, hence, when capturing a fraction of the 32K signals, the driver clock need only be limited by that fraction.

Figure 6:
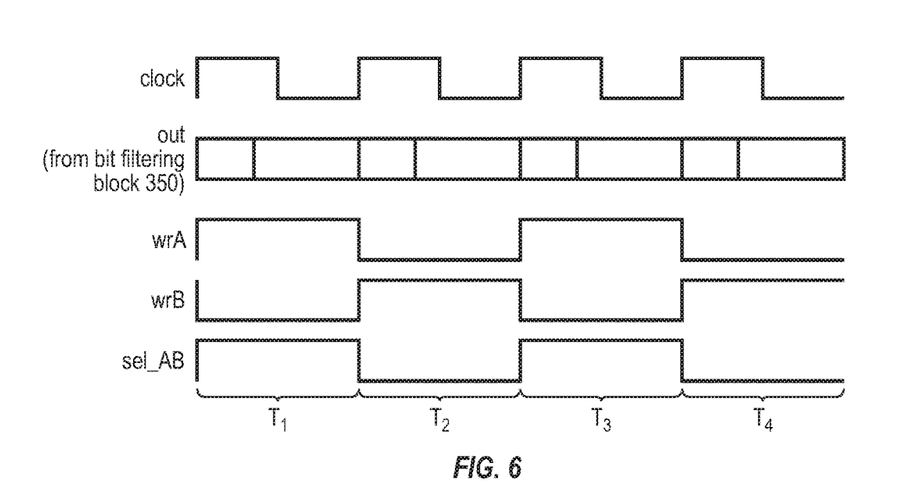
FIG. 6 is an exemplary timing diagram of a number of signals associated with the memory capture module shown in FIG. 5, in accordance with one embodiment of the present invention.

FIG. 6 is an exemplary timing diagram of a number of signals associated with memory capture block 400 shown in FIG. 5. During time periods $T_1$ and $T_3$, signal wrA is shown as being asserted thereby causing data Out received from bit filtering block 350 to be stored in buffer 402. During time periods $T_1$ and $T_3$, signal Sel_AB is shown as being in a logic high state thereby causing data stored in buffer 404 to be delivered via multiplexer 410 as signal Data_stream. During time periods $T_2$ and $T_4$, signal wrB is shown as being asserted thereby causing data Out received from bit filtering block 350 to be stored in buffer 404. During time periods $T_2$ and $T_4$, signal Sel_AB is shown as being in a logic low state thereby causing data stored in buffer 402 to be delivered via multiplexer 410 as signal Data_stream.

Memory buffers 402 and 404 therefore alternate roles every other cycle. Memory capture block 400 may, in one embodiment, forward up to 1024 32-bit words at any given emulation time. Memory buffers 402, 404 are read from and written into concurrently such that the data previously stored at the write address appears on the output latches, while the input data is stored in memory.

Figure 7:
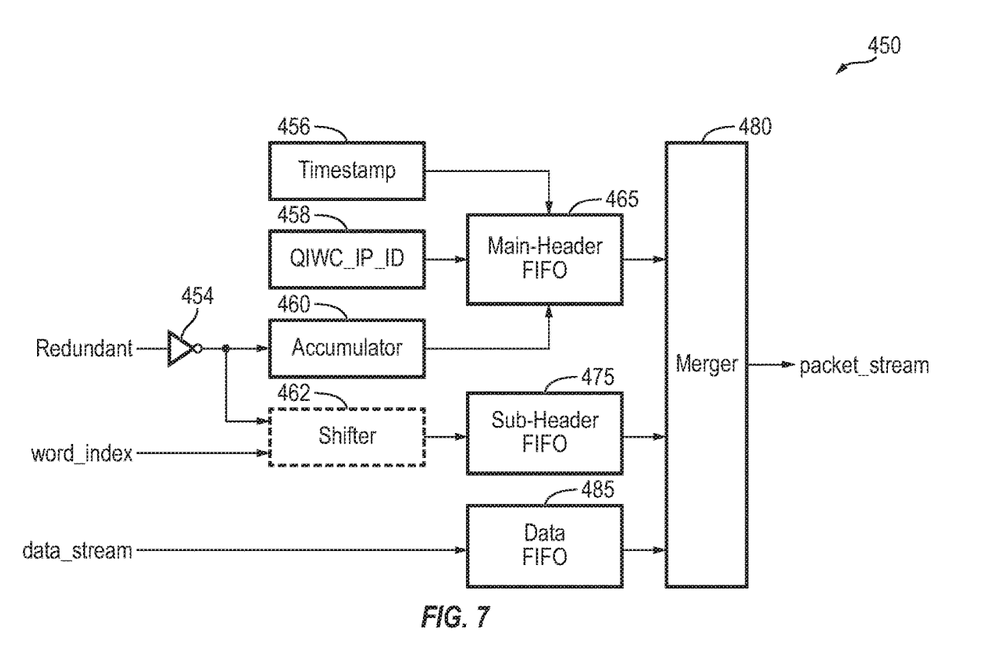
FIG. 7 is a simplified high-level block diagram of an exemplary data stream generator disposed in the macro of FIG. 3, in accordance with one embodiment of the present invention.
Figure 8:
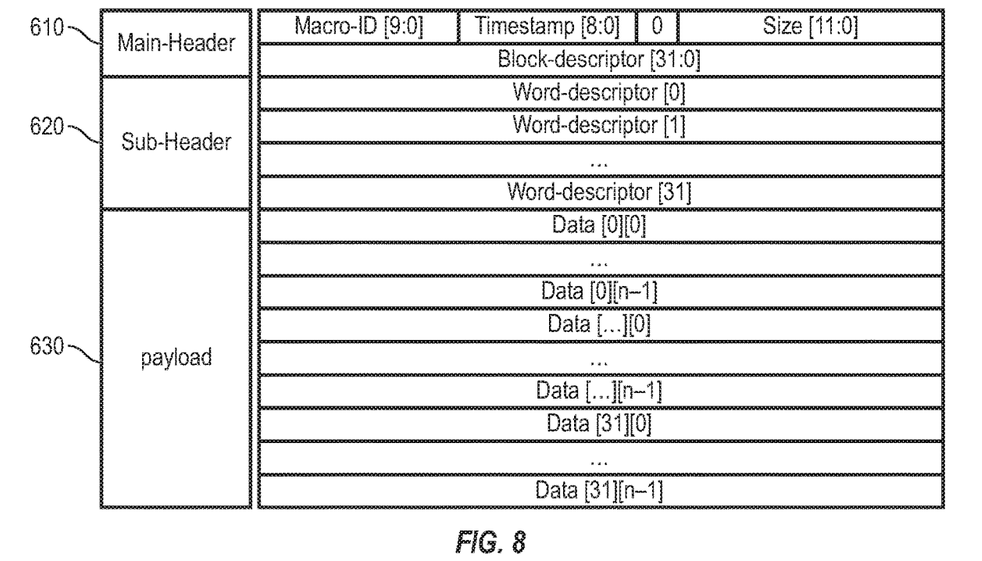
FIG. 8 is an exemplary packet formed by the data stream generator of FIG. 7, in accordance with one embodiment of the present invention.

FIG. 7 is a simplified high-level block diagram of an exemplary data stream generator 450, in accordance with one exemplary embodiment of the present invention. Data stream generator 450 is configured to form a stream of packets, an example of which is shown in FIG. 8 and described further below.

Signal Data_stream received from memory capture block 400 is stored in data FIFO (first-in-first-out) 485. The index of this data, namely signal Word_index, which is received from bit filtering block 350, is stored in sub-header FIFO 475. In some embodiments, signal Word_index is first passed through optional shifter (e.g., shift register) 46—which is controlled, in part, by signal Redundant—before being stored in sub-header FIFO 475.

Referring to FIGS. 6 and 7 concurrently, if the data stored in buffers 402 and 404 during two consecutive clock cycles are detected as not being identical, thereby causing signal Redundant to be zero, inverter 454 causes accumulator 460 to increment its count by 1. In other words, accumulator 460 maintains a count of the number of 32-bit data that are being stored in data FIFO 485. If the data stored in buffers 402 and 404 during two consecutive clock cycles are detected as being identical, accumulator 400's count is not incremented. Therefore, the number of 32-bit data stored in a packet, in accordance with one aspect of the present invention, may vary. Main header FIFO 465 is configured to store the value stored in accumulator 460, together with the timestamp value supplied by timestamp block 456 and the QiWC macro ID (identifier). Merger 480 is configured to receive the values supplied by main header FIFO 465, sub-header FIFO 475 and data FIFO (packet payload) 485 to form a packet which it subsequently transfers as its output signal Packet_stream In one embodiment, main header FIFO 465 may be 32-bits wide and have a depth of 64 words. In one embodiment, sub-header FIFO 475 may be 32-bits wide and have a depth of 128 words. In one embodiment, data FIFO 485 may be 36-bits wide and have a depth of 4K (4096). All three FIFOs 465, 475 and 485 may be configured in an FPGA.

As described above, the data collection by data stream generator 450 may begin once a non-redundant (32-bit) data word is received from the memory capture module 400. For each non-redundant data word, shifter 462 records the bit-position of the corresponding index, which is obtained from the bit-filtering block 350 through a pipeline of registers (e.g., pipeline 406 of FIG. 5). In one embodiment, accumulator 460 records the bit positions of all non-redundant sub-header FIFO 475 block-descriptions (one for each non-redundant bit recorded in the sub-header FIFO 475), and increments two counters, a main-header count and a sub-header count. Once all the data has been processed, the main-header is assembled by collecting into, for example, a 32-bit word, the QiWC macro identifier (qiwc_ip_id), the current time stamp, the packet size, which may be the sum of the two counters maintained by the accumulator, and the block-descriptor computed by the accumulator. Once the main-header has been assembled, it is written to the head of the main-header FIFO 465.

Each non-zero word-descriptor computed by the sub-header shifter 462 is written to the head of the sub-header FIFO 475. Similarly, each non-redundant data word is written to the head of the data FIFO 475.

As was described above, the final step is performed by the merger 480, which combines the data of the three FIFOs in a predefined packet format into a single 32-bit stream. Merger 480 may be a simple FSM with four states, as described in table VI below:

TABLE VI

| State | Description |
| --- | --- |
| IDLE | All data words are redundant. When an assembled Main-Header is read from tail of the FIFO the state changes to MAIN_HEADER. |
| MAIN_HEADER | The Main-Header is copied from the Main-Header FIFO to the output stream, and state changes to SUB_HEADERR |
| SUB_HEADER | The Sub-Header is copied from the Sub-Header FIFO to the output stream, and the state changes to DATA. |
| DATA | The payload is copied from the Data FIFO to the output stream, and the state changes to IDLE. |

Referring to FIG. 8, each QiWC packet 600 is shown as including three parts, namely a main-header 610, a sub-header 620, and a payload 630. Main header 610 identifies the QiWC macro generating the data, the timestamp, the length of the reminder of the packet (sub-header and payload), and a block-descriptor, which is a bit-vector indicating the contents of the sub-header, by specifying which word-descriptors exist in the sub-header. A "1" bit in the block-descriptor indicates that a corresponding word-descriptor exists in the sub-header.

Sub-header 620 is a variable sized sequence of 1 to 31 word-descriptors. A word-descriptor is a bit-vector that indicates which words in that particular index range contain any data. A "1" bit in the vector in a word-descriptor indicates that there exists a corresponding word in the payload. The sub-header may include up to 32 32-bit word descriptors in one embodiment. Hence, each bit represents one of the 32-bit words captured. In the embodiments described above, there is a total of 1024 bits in the sub-header; which is sufficient to describe the index of each 32-bit word captured by the macro.

Payload 630 is a variable sized sequence of 32-bit words in the exemplary embodiments described above. Each word represents the values captured for the QiWC data inputs at the corresponding index. The index is representative of the QiWC data index to which the corresponding signal was connected.

Figure 9:
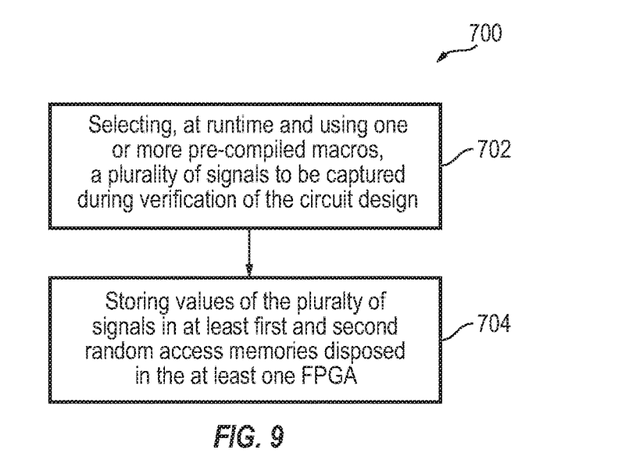
FIG. 9 is a flowchart for capturing signals using a macro in a hardware verification/emulation system, in accordance with one embodiment of the present invention.

FIG. 9 is a flowchart 700 for capturing signals, in accordance with one embodiment of the present invention. At 702, at run time and using one or more pre-compiled macros, a multitude of signals are selected for capture during verification of the circuit design. At 704, the values of the selected signals are stored in at least first and second random access memories disposed in the at least one FPGA.

Figure 10:
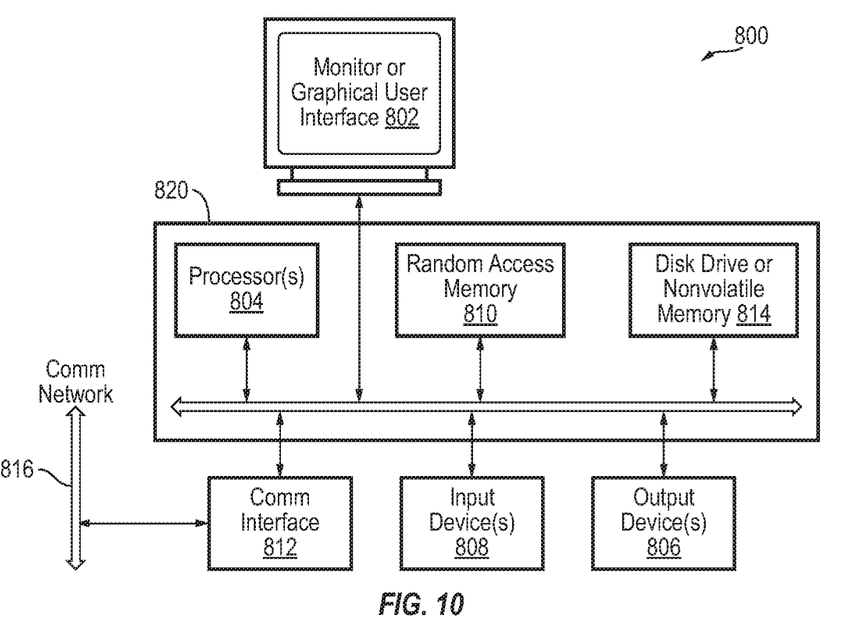
FIG. 10 is a simplified block diagram of an exemplary computer system that may include embodiments of the present invention.

FIG. 10 is an exemplary block diagram of a computer system 800 that may incorporate embodiments of the present invention. FIG. 10 is merely illustrative of a machine system to carry out aspects of the technical processes described herein, and does not limit the scope of the claims. One of ordinary skill in the art would recognize other variations, modifications, and alternatives. In one embodiment, the computer system 800 typically includes a monitor or graphical user interface 802, a computer 820, a communication network interface 812, input device(s) 808, output device(s) 806, and the like.

As depicted in FIG. 10, the computer 820 may include one or more processor(s) 804 that communicate with a number of peripheral devices via a bus subsystem 818. These peripheral devices may include input device(s) 808, output device(s) 806, communication network interface 812, and a storage subsystem, such as a random access memory 810 and a disk drive or nonvolatile memory 814.

The input device(s) 808 include devices and mechanisms for inputting information to the computer 820. These may include a keyboard, a keypad, a touch screen incorporated into the monitor or graphical user interface 802, audio input devices such as voice recognition systems, microphones, and other types of input devices. In various embodiments, the input device(s) 808 are typically embodied as a computer mouse, a trackball, a track pad, a joystick, wireless remote, drawing tablet, voice command system, eye tracking system, and the like. The input device(s) 808 typically allow a user to select objects, icons, text and the like that appear on the monitor or graphical user interface 802 via a command such as a click of a button or the like.

The output device(s) 806 include all possible types of devices and mechanisms for outputting information from the computer 820. These may include a display (e.g., monitor or graphical user interface 802), non-visual displays such as audio output devices, etc.

The communication network interface 812 provides an interface to communication networks (e.g., communication network 816) and devices external to the computer 820. The communication network interface 812 may serve as an interface for receiving data from and transmitting data to other systems. Embodiments of the communication network interface 812 typically include an Ethernet card, a modem (telephone, satellite, cable, ISDN), (asynchronous) digital subscriber line (DSL) unit, FireWire interface, USB interface, and the like. For example, the communication network interface 812 may be coupled to the communication network 816 via a FireWire bus, or the like. In other embodiments, the communication network interface 812 may be physically integrated on the motherboard of the computer 820, and may be a software program, such as soft DSL, or the like.

In various embodiments, the computer system 800 may also include software that enables communications over a network such as the HTTP, TCP/IP, RTP/RTSP protocols, and the like. In alternative embodiments, other communications software and transfer protocols may also be used, for example IPX, UDP or the like. In some embodiments, the computer 1920 in the processor(s) 804 may include one or more microprocessors from Intel®. Further, one embodiment, the computer 820 includes a UNIX-based operating system.

The random access memory 810 and the disk drive or nonvolatile memory 814 are examples of tangible media configured to store data and instructions to implement various embodiments of the processes described herein, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. The random access memory 810 and the disk drive or nonvolatile memory 814 may be configured to store the basic programming and data constructs that provide the functionality of the disclosed processes and other embodiments thereof that fall within the scope of the present invention.

Software code modules and instructions that implement embodiments of the present invention may be stored in the random access memory 810 and/or the disk drive or nonvolatile memory 814. These software modules may be executed by the processor(s) 804. The random access memory 810 and the disk drive or nonvolatile memory 814 may also provide a repository for storing data used by the software modules.

The random access memory 810 and the disk drive or nonvolatile memory 814 may include a number of memories including a main random access memory (RAM) for storage of instructions and data during program execution and a read only memory (ROM) in which fixed non-transitory instructions are stored. The random access memory 810 and the disk drive or nonvolatile memory 814 may include a file storage subsystem providing persistent (non-volatile) storage for program and data files. The random access memory 810 and the disk drive or nonvolatile memory 814 may include removable storage systems, such as removable flash memory.

The bus subsystem 818 provides a mechanism for letting the various components and subsystems of computer 820 communicate with each other as intended. Although the communication network interface 812 is depicted schematically as a single bus, alternative embodiments of the bus subsystem 818 may utilize multiple busses.

FIG. 10 is representative of a computer system capable of implementing embodiments of the present invention. It will be readily apparent to one of ordinary skill in the art that many other hardware and software configurations are suitable for use with embodiments of the present invention. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present invention may be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The above embodiments of the present invention are illustrative and not limitative. Embodiments of the present invention are not limited by the number of bits of the input or output data stream. Embodiments of the present invention are not limited by the number of bits used to represent a signal. Embodiments of the present invention are not limited by the size, type, or the number of RAM(s) used to store various data. Embodiments of the present invention are not limited by the FPGA used to simulate or emulate a circuit design. Other additions, subtractions or modifications are obvious in view of the present disclosure and are intended to fall within the scope of the appended claims.

What is claimed is:

1. A method of capturing signals during simulation or emulation of a circuit design using at least one field-programmable gate array (FPGA), the method comprising:
   selecting, at run time, a plurality of signals, one signal at a time, to be captured using one or more pre-compiled macros after compilation of the circuit design; and
   assigning an index to each of the selected signals.

2. The method of claim 1 further comprising:
   receiving a stream of n-bit values associated with the selected signals during the emulation;
   selecting a first k-bit value from the stream of n-bit values in accordance with each of the plurality of indices, each first k-bit value representing a value of one of the selected signals, wherein both n and k are integers and wherein n is greater than k;
   selecting a second k-bit value representative of a mask value in accordance with each of the plurality of indices;
   performing an AND function between the first and second k-bit values associated with a same index so as to generate a k-bit value for each of the selected signals.

3. The method of claim 2 further comprising:
   storing a first k-bit value associated with each selected signal in a RAM during even cycles of a sequencer; and
   storing a second k-bit value associated with each selected signal in the RAM during odd cycles of the sequencer.

4. The method of claim 2 further comprising:
   comparing the first and second k-bit values associated with each selected signal to detect if the first and second k-bit values associated with each selected signal match;
   storing the first and second k-bit values associated with each selected signal in a first FIFO if there is no match;
   storing one of the first or second k-bit values associated with each selected if there is a match; and incrementing a count if there is no match.

5. The method of claim 4 further comprising: storing the index associated with each selected signal in a second FIFO.

6. The method of claim 5 further comprising:
   storing the count, a timestamp and a macro ID associated with each selected signal in a third FIFO.

7. The method of claim 6 further comprising:
   a merging block configured to merge contents of the first, second and third FIFOs to form a packet.

8. The method of claim 7 further comprising:
   a memory configure to store the index assigned to each selected signal; and
   a multiplexer adapted to select the first k-bit value from the stream of n-bit values applied to the multiplexer in response to the associated index value stored in the memory.

9. The method of claim 8 wherein said multiplexer is a multi-stage multiplexer.

10. The method of claim 9 wherein said sequencer supplies addresses to the memory.

11. The method of claim 10 wherein said n is 32768 and said k is 32.

12. The method of claim 1 wherein said RAM has addressable storage spaces distributed at a plurality of locations in the FPGA.

13. A system configured to capture signals during simulation or emulation of a circuit design, the system comprising:
- a memory storing instructions; and
- a processor, coupled with the memory and to execute the instructions, the instructions when executed cause the processor to:
  - select, at run time, a plurality of signals, one signal at a time, to be captured using one or more pre-compiled macros after compilation of the circuit design; and
  - assign an index to each of the selected signals.

14. The system of claim 13 wherein said instructions further cause the processor to:
- receive a stream of n-bit values associated with the selected signals during the emulation;
- select a first k-bit value from the stream of n-bit values in accordance with each of the plurality of indices, each first k-bit value representing a value of one of the selected signals, wherein both n and k are integers and wherein n is greater than k;
- select a second k-bit value representative of a mask value in accordance with each of the plurality of indices; and
- perform an AND function between the first and second k-bit values associated with a same index so as to generate a k-bit value for each of the selected signals.

15. The system of claim 14 wherein said instructions further cause the processor to:
- store a first k-bit value associated with each selected signal in a RAM during even cycles of a sequencer; and
- store a second k-bit value associated with each selected signal in the RAM during odd cycles of the sequencer.

16. The system of claim 14 wherein said instructions further cause the processor to:
- compare the first and second k-bit values associated with each selected signal to detect if the first and second k-bit values associated with each selected signal match;
- store the first and second k-bit values associated with each selected signal in a first FIFO if there is no match;
- store one of the first or second k-bit values associated with each selected if there is a match; and increment a count if there is no match.

17. A non-transitory computer readable medium comprising stored instructions, which when executed by a processor, cause the processor to capture signals during simulation or emulation of a circuit design, the instruction further causing the processor to:
- select, at run time, a plurality of signals, one signal at a time, to be captured using one or more pre-compiled macros after compilation of the circuit design; and
- assign an index to each of the selected signals.

18. The non-transitory computer readable medium of claim 17 wherein the instruction further cause the processor to:
- receive a stream of n-bit values associated with the selected signals during the emulation;
- select a first k-bit value from the stream of n-bit values in accordance with each of the plurality of indices, each first k-bit value representing a value of one of the selected signals, wherein both n and k are integers and wherein n is greater than k;
- select a second k-bit value representative of a mask value in accordance with each of the plurality of indices; and
- perform an AND function between the first and second k-bit values associated with a same index so as to generate a k-bit value for each of the selected signals.

19. The non-transitory computer readable medium of claim 18 wherein the instruction further cause the processor to:
- store a first k-bit value associated with each selected signal in a RAM during even cycles of a sequencer; and
- store a second k-bit value associated with each selected signal in the RAM during odd cycles of the sequencer.

20. The non-transitory computer readable medium of claim 18 wherein the instruction further cause the processor to:
- compare the first and second k-bit values associated with each selected signal to detect if the first and second k-bit values associated with each selected signal match;
- store the first and second k-bit values associated with each selected signal in a first FIFO if there is no match; and
- store one of the first or second k-bit values associated with each selected if there is a match; and increment a count if there is no match.

* * * * *